(12) United States Patent
Näslund et al.

(10) Patent No.: US 9,282,095 B2
(45) Date of Patent: Mar. 8, 2016

(54) SECURITY AND PRIVACY ENHANCEMENTS FOR SECURITY DEVICES

(71) Applicant: Telefonaktiebolaget LM Ericsson (publ), Stockholm (SE)

(72) Inventors: Mats Näslund, Vällingby (SE); Karl Norrman, Stockholm (SE); Tomas Goldbeck-Löwe, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 71 days.

(21) Appl. No.: 14/309,221

(22) Filed: Jun. 19, 2014

(65) Prior Publication Data

US 2014/0304768 A1    Oct. 9, 2014

Related U.S. Application Data

(63) Continuation of application No. 10/530,293, filed as application No. PCT/SE03/01461 on Sep. 17, 2003, now abandoned.

(60) Provisional application No. 60/416,272, filed on Oct. 7, 2002.

(51) Int. Cl.
*H04L 29/06*        (2006.01)
*H04L 9/08*        (2006.01)
(Continued)

(52) U.S. Cl.
CPC .......... *H04L 63/0853* (2013.01); *H04L 9/0844* (2013.01); *H04L 9/3271* (2013.01); *H04W 12/06* (2013.01); *H04W 12/12* (2013.01); *H04L 2209/80* (2013.01); *H04W 74/00* (2013.01)

(58) Field of Classification Search
CPC . H04L 63/0853; H04L 9/0844; H04L 9/3271; H04L 2209/80; H04W 12/06; H04W 74/00; H04W 12/12
See application file for complete search history.

(56) References Cited

U.S. PATENT DOCUMENTS 4,748,668 A    5/1988    Shamir et al.
4,853,522 A    8/1989    Ogasawara
(Continued)

FOREIGN PATENT DOCUMENTS

EP    0 759 410        12/1996
EP    1081891 A2    3/2001
(Continued)

OTHER PUBLICATIONS

Summary of Japanese official action, Dec. 10, 2010, in corresponding Japanese Application No. JP 2004-548211.
(Continued)

*Primary Examiner* — Darren B Schwartz (57) ABSTRACT

A tamper-resistant security device, such as a subscriber identity module or equivalent, has an AKA (Authentication and Key Agreement) module for performing an AKA process with a security key stored in the device, as well as means for external communication. The tamper-resistant security device includes an application that cooperates with the AKA module and an internal interface for communications between the AKA module and the application. The application cooperating with the AKA module is preferably a security and/or privacy enhancing application. For increased security, the security device may also detect whether it is operated in its normal secure environment or a foreign less secure environment and set access rights to resident files or commands that could expose the AKA process or corresponding parameters accordingly.

20 Claims, 8 Drawing Sheets

(51) Int. Cl.
*H04L 9/32* (2006.01)
*H04W 12/06* (2009.01)
*H04W 12/12* (2009.01)
*H04W 74/00* (2009.01)

(56) References Cited

U.S. PATENT DOCUMENTS

| | | | |
|---|---|---|---|
| 5,386,468 A | 1/1995 | Akiyama et al. | |
| 5,422,953 A | 6/1995 | Fischer | |
| 5,537,474 A | 7/1996 | Brown et al. | |
| 5,602,918 A * | 2/1997 | Chen | G06Q 20/341 380/281 |
| 5,623,637 A | 4/1997 | Zachai et al. | |
| 5,651,068 A * | 7/1997 | Klemba | G06F 21/602 235/380 |
| 5,661,806 A * | 8/1997 | Nevoux | H04L 9/0844 380/247 |
| 5,668,878 A | 9/1997 | Brands | |
| 5,740,403 A | 4/1998 | Kowalski | |
| 5,757,918 A | 5/1998 | Hopkins | |
| 5,856,659 A * | 1/1999 | Drupsteen | G06Q 20/341 235/375 |
| 6,141,756 A | 10/2000 | Bright et al. | |
| 6,470,454 B1 | 10/2002 | Challener et al. | |
| 6,507,907 B1 | 1/2003 | Takahashi et al. | |
| 6,516,414 B1 * | 2/2003 | Zhang | G06F 21/445 713/168 |
| 6,606,707 B1 * | 8/2003 | Hirota | G06F 21/10 713/172 |
| 6,687,375 B1 | 2/2004 | Matyas et al. | |
| 6,711,400 B1 | 3/2004 | Aura | |
| 6,816,968 B1 * | 11/2004 | Walmsley | G06F 21/31 380/259 |
| 6,859,535 B1 * | 2/2005 | Tatebayashi | G06F 21/10 380/201 |
| 7,039,191 B2 | 5/2006 | Shinohara | |
| 7,047,416 B2 | 5/2006 | Wheeler et al. | |
| 7,096,504 B1 * | 8/2006 | Tagawa | G06Q 20/12 705/51 |
| 7,149,308 B1 | 12/2006 | Fruehauf et al. | |
| 2001/0034840 A1 * | 10/2001 | Sion | G06F 21/123 713/193 |
| 2001/0046839 A1 * | 11/2001 | Latva-Aho | H04L 63/0853 455/3.05 |
| 2002/0044648 A1 | 4/2002 | Arazi | |
| 2002/0066042 A1 * | 5/2002 | Matsumoto | G06Q 20/02 726/7 |
| 2002/0108043 A1 | 8/2002 | Tanaka | |
| 2002/0161571 A1 * | 10/2002 | Matsushima | G06F 21/10 704/200 |
| 2002/0174337 A1 * | 11/2002 | Aihara | G06F 21/78 713/172 |
| 2002/0176575 A1 * | 11/2002 | Qawami | G06F 21/10 380/201 |
| 2002/0187808 A1 * | 12/2002 | Vallstrom | H04M 1/675 455/558 |
| 2003/0023871 A1 | 1/2003 | Gnanasabapathy et al. | |
| 2003/0028771 A1 | 2/2003 | Kocher et al. | |
| 2003/0033537 A1 | 2/2003 | Fujimoto et al. | |
| 2003/0056100 A1 | 3/2003 | Beatson | |
| 2003/0159067 A1 | 8/2003 | Stirbu | |
| 2007/0189534 A1 | 8/2007 | Wood et al. | |

FOREIGN PATENT DOCUMENTS

| | | |
|---|---|---|
| EP | 1 168 870 A | 1/2002 |
| GB | 0129339-8 | 12/2001 |
| JP | 08-139718 | 5/1996 |
| JP | 2002-232412 | 8/2002 |
| WO | WO 95/16238 | 12/1996 |
| WO | WO 00/48416 | 8/2000 |
| WO | WO 0077974 | 12/2000 |
| WO | WO 02/084980 | 10/2002 |
| WO | 03 056863 A | 7/2003 |

OTHER PUBLICATIONS

Summary of Korean official action, mailed Jun. 25, 2010, in corresponding Korean Application No. 2005-7005980.
Office Action mailed Jun. 3, 2010 in co-pending U.S. Appl. No. 10/533,120.
Summary of Japanese Official Action, Feb. 19, 2010, in corresponding Japanese patent application No. 2004-548211.
Aoki et al., "Cryptography Authentication Hardware Accelerator", NTT Technical Journal, The Telecommunication Association (TTA) vol. 11, No. 3, pp. 17-22, Mar. 5, 1999.
U.S. Appl. No. 10/533,120, filed Sep. 19, 2005; Smeets et al.
Office Action mailed Feb. 12, 2009 in co-pending U.S. Appl. No. 10/533,120.
Office Action mailed Jul. 10, 2009 in co-pending U.S. Appl. No. 10/533,120.
International Preliminary Report on Patentability for PCT/SE2003/01660.
"Digital Signature Cards Range"—Secure smart cards for doing electronic business; GEMPLUS; Oct. 27, 2003; http://www.gemplus.com/products/dig_sign_cards_range.
Stacy Cannady and Thomas H. Stockton; "Easing the PAIN"—How PKI can reduce the risks associated with e-business transactions; IBM; Feb. 1, 2001; http://www-106.ibm.com/developerworks/library/s-pain.html.
"The Mechanisms of Data Security;" Sep. 2, 2003; http://www.cardsnowindia.com/news/security1.htm.
"Security in an open world;" SkillTeam; Sep. 2, 2003; http://www.common.lu.
Krawczyk et al.; "HMAC: Keyed-Hashing for Message Authentication;" IETF; RFC 2104; Feb. 1997.
Menezes, van Oorschot, and Vanstone; "Handbook of Applied Cryptography;" Chapter 1 Overview of Cryptography; Chapter 9 Hash Functions and Data Integrity; Chapter 12 Key Establishment Protocols; CRC Press, 1996.
Digital Cellular Telecommunications System (Phase 2+); Subscriber Identify Modules (SIM); Functional Characteristics (GSM 02.17 version 6.0.0 Release 1997), ETSI TS 100 922 V6.0.0 (Nov. 1998), p. 1-13.
H. Haverinen et al., Extensible Authentication Protocol Method for Global System for Mobile Communications (GSM) Subscriber Identify Modules (EAP-SIM), Network Working Group, Jan. 2006, Section 3, p. 8-10 and Section 12, p. 66-74.
Secure Hash Standard, FIPS Pub 180-1, May 11, 1993, pp. 1-17.
J. Arkko et al., Extensible Authentication Protocol Method for $3^{rd}$ Generation Authentication and Key Agreement (EAP-AKA), Network Working Group, Jan. 2006, Section 3, pp. 9-15 and Section 7, pp. 43-45.
3GPP TS 11.11 V8.14.0 (Jun. 2007); Clause 7, p. 28-29, Clause 8.16 and 8.19, p. 36, Clause 9.2.16 and 9.2.20, p. 46-47, Clause 11.4, p. 120-1222, Claus 11.6, p. 128-131.
3GPP TS 11.14 V8.18.0 (Jun. 2007), p. 1-57.
3GPP TS 31.111 V8.4.0 (Jan. 2009), p. 1-96.
3 GPP TS 03.19 V8.5.0 (Sep. 2002), p. 1-34.
3GPP TS 03.48 V8.9.0 (Jun. 2005), p. 1-34.
J. Arkko et al., MIKEY: Multimeda Internet KEYing, Network Working Group, Aug. 2004, Section 2-4, p. 7-26.
Sarvar Patel, Analysis of EAP-SIM Session Key Agreement, May 29, 2003, p. 1-4.
A. Niemi et al., IETF RFC 3310, Hypertext Transfer Protocol (HTTP) Digest Authentication Using Authentication and key Agreement (AKA); Network Working Group, Sep. 2002., p. Section 2-3, p. 4-8.
3GPP TSG SA WG3 Security, Enhanced Security for A/Gb, JUl. 15-18, 2003, p. 1-5.
A. Menezes et al., Handbook of Applied Cryptography, CRC Press, Aug. 2001, p. 515-520.
Wireless Identity Module, Part: Security. Jul. 12, 2001, WAP-260-WIM-20010712-a, Wireless Application Protocol Forum.

* cited by examiner

*(Prior Art)*

Fig. 1

*(Prior Art)*

SECURITY AND PRIVACY ENHANCEMENTS FOR SECURITY DEVICES

PRIORITY APPLICATIONS

This is a continuation of U.S. application Ser. No. 10/530,293, filed Apr. 4, 2005, which is the U.S. national phase of International Application No. PCT/SE2003/001461, filed 17 Sep. 2003 which designated the U.S. and claims benefit of U.S. 60/416,272, filed 7 Oct. 2002, the entire contents of each of which are hereby incorporated by reference.

TECHNICAL FIELD

The present invention generally relates to Authentication and Key Agreement (AKA) procedures in communication systems, and more particularly to the use and configuration of tamper-resistant security devices in such procedures.

BACKGROUND

In general, Authentication and Key Agreement (AKA) includes mutual authentication, which means that each of the communicating parties, such as a user and an associated operator, can be certain that the other party is the alleged party, but may also include preserved privacy, which for example means that the initiating party, normally the user, can use a pseudonym for his/her identity. The operator will then be able to determine the user's true identity, whereas no third party will be able to. Naturally, there is usually no point in performing authentication, unless some subsequent actions and/or procedures involving the authenticated parties are performed. Typically, the authentication therefore finally results in a key agreement from which one or more keys are obtained that are used to protect further communication between the parties, and to ensure that each consecutive message originates from the other party.

Many network services are based on storing user credentials (typically a secret key k, and possibly also user identities and pseudonyms) on a tamper-resistant "security device", e.g. a GSM SIM (Subscriber Identity Module), a UMTS SIM or an ISIM (IP Multimedia SIM) card, and letting the network interact with this device through a user terminal in a challenge-response protocol to perform (subscriber) Authentication and Key Agreement (AKA). In the remainder, we simply refer to such a protocol as an AKA protocol. For example, this includes the GSM and UMTS AKA protocols.

Figure 1:
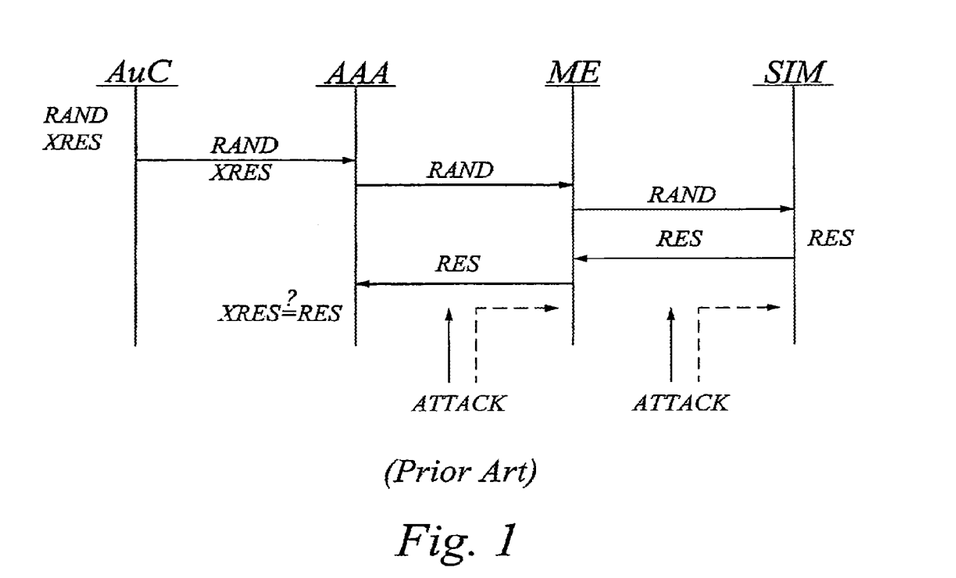
FIG. 1 is a schematic diagram of a typical prior art challenge-response authentication procedure illustrating transmission of information between relevant parties.

Typically the protocol works as follows, as schematically illustrated in FIG. 1. In a subscriber database/authentication center, commonly referred to as an AuC in the context of mobile communication systems, an expected response XRES is generated based on knowledge of the secret key and a generated challenge RAND. The AKA protocol may, and typically will, involve an AAA (Authorization, Authentication and Accounting) server, which may or may not be physically co-located with the AuC. The challenge RAND and the expected response XRES are normally transferred to the AAA server. The challenge is sent to the terminal ME (Mobile Equipment), which assisted by the security device computes the response RES. The response is sent back to the AAA server, and if it matches the expected response, the user is authenticated. In FIG. 1, only the challenge response protocol is shown. In reality, for example session keys for encryption are also generated.

A problem is that in some cases (again e.g. GSM SILMs, using the COMP128 algorithm) the cryptographic algorithms used in the AKA protocol are not very strong, and by obtaining a relatively small number of challenge-response pairs, an attacker can reverse-engineer the security device (and find out what k is).

This problem gets worse by the fact that there are several suggested solutions, where, to gain different types of accesses and services, the security device needs to be pulled out of its normal environment (e.g. a mobile phone) and put into a foreign environment. For instance, the security device is put into a card-reader connected over a USB (Universal Serial Bus) port to a PC (Personal Computer). Since a PC, compared to a mobile phone, is relatively vulnerable to infections by viruses and Trojans, it is possible that malicious software is planted that, unbeknownst to the user, "pulls" challenge-response values from the device and (possibly later) forwards them to an attacker for analysis. This is a serious threat in cases where there is no authentication of the challenges (e.g. legacy GSM systems), or when the challenges are authenticated, but a security flaw in that authentication is found. The analysis for attacks can be based on passive eavesdropping (indicated in FIG. 1 by "ATTACK" and solid lines), or by active injection of adaptively chosen challenges (indicated in FIG. 1 by "ATTACK" and dashed lines).

Even if the security card remains in the terminal/phone all the time, there are cases where security could be compromised. For instance, there are suggestions to reuse the AKA protocol over another interface, e.g. Bluetooth or IRDA, in order to be able to use the credentials on the card to authenticate to other services besides network access. For example, the phone could communicate with a cash register in a shop to pay for purchased goods, acting as an "electronic wallet". Since, for example, GSM SIMs cannot by default authenticate the device that requests authentication (i.e. the authentication is not mutual) there is a risk that malicious devices are put up in public places with the intent to attack weak algorithms on the cards. A probably worse threat is that of an adversary installing a malicious agent in the terminal. Such an agent may then be activated remotely when an attacker wants to authenticate for a server, providing the attacker with AKA parameters from the infected terminal. This severely restricts the business cases in which, for example, SIM based authentication can be used.

In the very specific case of GSM SIMs, there is work in progress in IETF, [1], to enhance the security by encapsulating the GSM A3/A8 responses in a more secure algorithm such as the MD5 or SHA1 algorithms, [2]. More precisely, rather than returning the values of the A3/A8 algorithms directly, they are used as input to a stronger function, and the result of that function is returned instead. This prevents direct analysis of the outputs of A3/A8. This work, which can be referred to as a SIM profile of the Extensible Authentication Protocol (EAP-SIM), also provides a partial solution to the fact that more than the standard 64-bits of GSM keying material might be needed. This is accomplished by querying the A3/A8 algorithms sequentially on different RAND-values, concatenating the results into a longer key.

Figure 2:
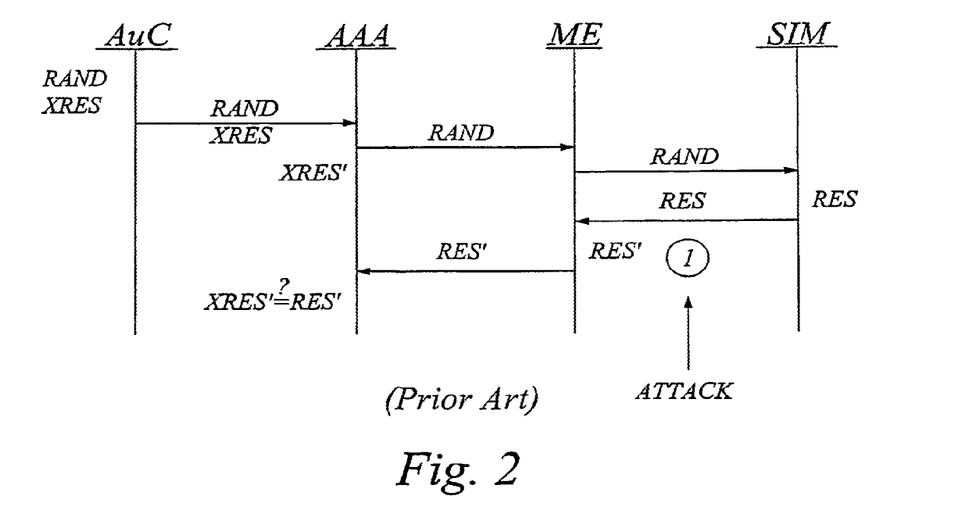
FIG. 2 is a schematic diagram of a prior art challenge-response authentication extended with the EAP-SIM protocol.

FIG. 2 illustrates the conventional extended authentication protocol EAP-SIM. The mobile equipment (ME) or other user terminal relays the challenge to the SIM, and computes the response RES and then a hash of the response. This hash is then sent to the AAA server as the new response RES'. The AAA server naturally implements the same hash function. An attacker that sniffs the traffic between the AAA server and the ME will in this case not get access to the output, RES, from A3/A8 directly, but only to the hash, RES', of the A3/A8 output. It can be noted that similar work is also in progress for UMTS AKA, [3].

While the EAP SIM proposal addressed the theoretical problems with the GSM A3/A8 algorithms, or specifically the COMP128 implementations thereof, it has several shortcomings. To start with, the solution will only solve the specific problems related to COMP128/GSM. If the EAP encapsulation is implemented in the terminal, e.g. a laptop, the SIM-ME interface, indicated by an encircled "1" in FIG. 2, is also available to viruses and Trojans. This implies that chosen challenges and corresponding responses will still be available to an attacker. Preferably, any solution to this particular problem should not require changing the SIM-ME interface standard as specified in reference [4]. It will take time to change the standard, and it might not even be possible before standard UMTS USIMs, which are stronger and do not need the extra protection, are available on the market. Also, as noted in the introduction, it has been suggested that GSM phones/networks compliant with UMTS Release 99 (R99) should support the stronger UMTS AKA. Hence, such a standardization effort is questionable. In addition, it cannot be excluded that the EAP SIM proposal itself has some weakness and may later need to be "tweaked". In fact, the approach of using several RAND values in sequence to derive longer keys was recently discovered to have some flaws. For instance, by issuing the same RAND value repeated n times, rather than n distinct RAND values, the effective security obtained may still only be equivalent to that obtained from a single RAND value.

SUMMARY

The present invention overcomes these and other drawbacks of the prior art arrangements.

It is a general object of the invention to provide enhanced security and/or privacy in connection with authentication and/or key agreement.

It is an object to provide an improved SIM or similar tamper-resistant security device. In this respect, it is particularly desirable to extend the functionality of the tamper-resistant security device for the purpose of enhanced security and/or privacy.

It is also an object of the invention to maintain the overall security even if a tamper-resistant security device such as a SIM is used in an insecure environment or when reusing the AKA protocol over a less secure interface.

Another object is to provide a user terminal adapted for enhanced security and/or privacy.

Still another object of the invention is to provide a network server supporting security and/or privacy enhancements in tamper-resistant security devices installed in user terminals.

As indicated above, the invention generally relates to a tamper-resistant security device, such as a subscriber identity module or equivalent, which has means for storing user credentials, including at least a security key, an AKA (Authentication and Key Agreement) module for performing an AKA process with the security key, as well as means for external communication.

The basic idea according to a main aspect of the invention is to provide the tamper-resistant security device with an application adapted for cooperating with the AKA module, and means for interfacing the AKA module to this application.

The application cooperating with the AKA module is preferably a security and/or privacy enhancing application, which typically performs enhanced security and/or privacy processing related to authentication and/or key agreement of the AKA module.

For enhanced security, the application performs somewhat different security processing tasks depending on the particular security goals to be accomplished. In general, the enhanced security processing may involve processing of one or more input parameters (re-processing) and/or output parameters (post-processing) of the AKA process. For example, a security enhancing application may be configured for encapsulating AKA responses in a more secure algorithm, e.g. as suggested in the EAP SIM protocol mentioned above. However, according to the invention, all sensitive processing takes place in the tamper-resistant security device, including the security enhancing steps. Thus, considering the increased strength of the EAP SIM and similar security enhancing algorithms, the probability that attacks aimed at retrieving the secret key or other sensitive data will be successful is significantly reduced. Accordingly, the overall security can be maintained even if the tamper-resistant security device is used in a less secure environment such as a personal computer (PC), or when reusing the AKA protocol over a less secure interface such as Bluetooth.

Other examples of enhanced security processing that may be performed by the security application of the invention include i) extending the basic security functionality to generate additional keying material, e.g. one or more (possibly longer) keys based on one or more challenge-response queries, ii) executing at least part of the computations required for generating a shared key for end-to-end encryption between two users (based on the key in the SIM or similar security device), and iii) masking AKA key information generated by the AKA module. For example, additional keying material could be useful for the purposes of lawful interception with increased security from the end-user's point of view, or for security enhancements associated with public access.

The invention can also be used to perform replay checks, ensuring that the same AKA input parameter (RAND) is not re-used in ways that are not secure. In particular, when combining several AKA output parameters into a higher security response or key, it is important to make sure that a set of unique AKA input parameters (RAND values) are used.

For privacy enhancement, an important aspect is to protect the user's identity by managing (maintaining or possibly generating) proper user pseudonyms, also called temporary user identifiers, as will be described later on.

In the context of enhanced security, the tamper-resistant security device and/or the corresponding user terminal is preferably configured for performing some form of security policy processing. The security policy processing normally involves security policy decision and/or enforcement, and is preferably based on information representative of the security conditions in relation to the tamper-resistant security device. For example, it is important that the overall security enhancement is not compromised by unauthorized access, e.g. by viruses and Trojans, to resident application files and commands of the tamper-resistant security device that could expose the AKA process and the corresponding AKA parameters. Therefore, the tamper-resistant device is advantageously adapted for allowing access to such resident files and commands only under given circumstances. More particularly, certain resident files and commands of the tamper-resistant device are preferably disabled when the security device is pulled out of its normal environment, e.g. a mobile phone, and plugged into a more hostile environment such as a PC or the like. Instead, any requests for AKA processing are conveniently routed to the security enhancing application. This could be managed, for example by utilizing an internal or external module for detecting the security conditions of the tamper-resistant security device and/or by letting the user enter different PIN codes or equivalent to set access rights in dependence on the type of device into which the security device is arranged. In similarity, when reusing the AKA protocol over a less secure interface such as Bluetooth, the user terminal may re-route AKA requests to the security-enhancing application.

It has been recognized that it is particularly advantageous to implement the security enhancing and/or privacy enhancing application as a software application, preferably as an applet, which may be pre-installed during manufacture or provided as an authenticated application download into an application environment in the tamper-resistant security device. For example, the application environment may be provided by the GSM SAT (SIM Application Toolkit) of ordinary GSM SIM cards, or the UMTS SAT of UMTS SIM cards. In general, the application is securely (preferably authenticated and encrypted) downloaded into the application environment from a network server managed by a trusted party such as a network operator associated with the GSM UMTS SIM.

The application together with one or more security policies is easily replaced or upgraded (even over the air interface) so that the terminal/security device has the latest "release" of the applications applet. In addition, since the applets are normally under the control of the network operator or other trusted party and "signed" by the operator, they are by far less likely to be infected by malicious software than applets on an ordinary PC.

In a hostile environment, typically in external devices, challenges to the AKA process are sent as input data to the application in the application environment, instead of using the ordinary command (e.g. the RUN_GSM_ALGORITHMS command of GSM SIMs) for invoking the AKA algorithms.

If the application files/input data are transferred into the application environment by using an existing command, such as the ENVELOPE command of the GSM SAT, the input/output interface of the tamper-resistant security device does not require any changes. This is important since the invention hence does not violate existing standard specifications.

In an alternative embodiment of the invention, the AKA algorithms are also at least partly implemented, preferably together with the enhanced security and/or privacy processing, as an application in the application environment of the tamper-resistant device. Apparently, this approach does not require a special interface between the resident AKA module and the application environment, since both the enhanced security and/or privacy processing and the AKA algorithms are located in the application environment. Naturally, there will still be some program code interface between the AKA algorithms and the security enhancing functionality.

It should be understood that although a software implementation is particularly beneficial, it is also possible to have the AKA cooperating application premanufactured as hardware in tamper-resistant security device, with a more or less direct interface between the hardware application and the AKA module.

The invention offers the following advantages:

From the terminal point of view, the present invention shows how to extend and improve legacy SIMs and similar tamper-resistant security devices with an extra security layer that protects the device in hostile environments subject to viruses and Trojans.

It also shows a simple way to extend functionality to achieve new security/privacy goals based on legacy technology.

A main merit is that the solution is future proof and easy to administer in a secure way by authenticated downloads.

The solution is in a sense transparent to the device into which the tamper-resistant security device is plugged. In addition, it enables secure remote access directly to the security device, such as a SIM, when the security device is still in the original (mobile) terminal, communicating over e.g. Bluetooth. This means that the mobile terminal can be used as a "generic" authentication device, without threatening the security of the SIM.

From the network point of view, it should be noted that the AuC (or similar) node can be left completely unchanged, it is only the AAA server, if such a server is used, that needs to implement the extra security processing.

Finally, many of the proposed embodiments have no standards impact, but may require slight change of the internal SAT environment's APIs towards the normal SIM functionality.

Other advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EXAMPLE EMBODIMENTS

Throughout the drawings, the same reference characters will be used for corresponding or similar elements.

As will be described below, it is possible to obtain the above and other security goals in a way that can be used regardless of what algorithms that are currently implemented on the security device.

Figure 3:
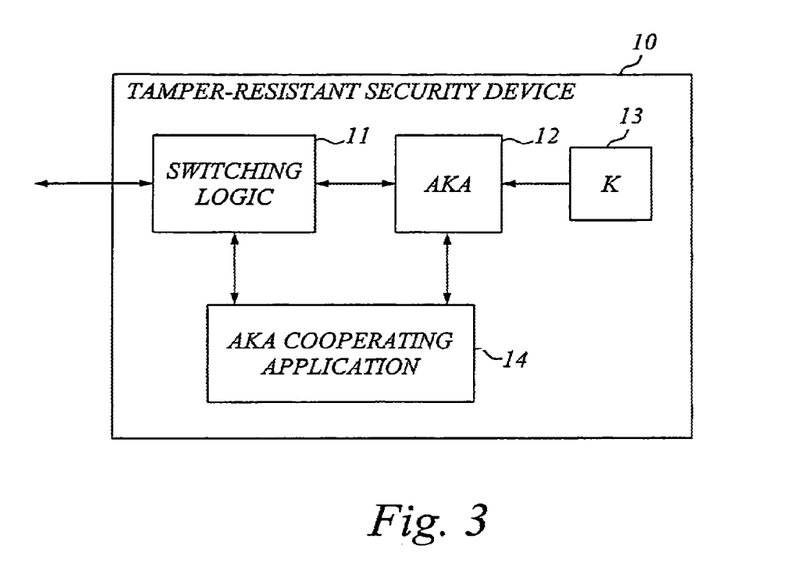
FIG. 3 illustrates an exemplary embodiment of a tamper-resistant security device according to the invention.

The basic idea according to a main aspect of the invention is to provide an application adapted for cooperating with the AKA module as well as an interface, for example an API or similar interface, between the AKA module and the application, as schematically illustrated in FIG. 3.

FIG. 3 illustrates an exemplary embodiment of a tamper-resistant security device according to the invention. The security device 10 basically comprises switching logic 11, an AKA module 12, securely stored user credentials 13 including at least a security key K (possibly also user identities and pseudonyms), an application 14 adapted for cooperating with the AKA module, and a more or less direct interface between the AKA module 12 and the AKA cooperating application 14. The switching logic 11 parses commands sent to the security device and handles communication with internal functions. The AKA module 12 comprises algorithms for authentication and/or key agreement based at least partly on the security key K.

Figure 4:
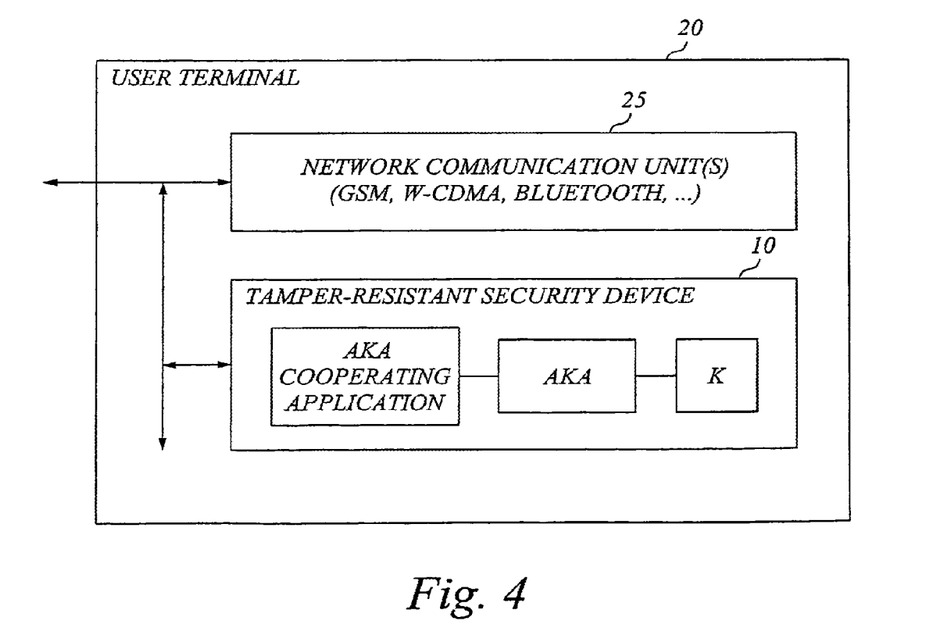
FIG. 4 is a schematic diagram of a user terminal equipped with a tamper-resistant security device according to an exemplary embodiment of the invention.

The tamper-resistant security device is preferably adapted for implementation in a network device such as a user terminal or equivalent FIG. 4 illustrates a user terminal 20, such as a mobile phone or a personal computer, which generally has some form of network communication capabilities 25 and a tamper-resistant security device 10 similar to that shown in FIG. 3.

The application cooperating with the AKA module is normally an application related to authentication and/or key agreement, and preferably a security and/or privacy enhancing application.

For enhanced security, the application performs somewhat different security processing tasks depending on the particular security goals. The enhanced security processing is normally related to authentication and/or key agreement of the AKA module, and associated with input parameters and/or output parameters of the AKA process.

In the context of enhanced security, the tamper-resistant security device and/or the corresponding user terminal is preferably configured for performing some form of security policy processing. The security policy processing normally involves security policy decision and/or enforcement, and is preferably based on information representative of the security conditions in relation to the tamper-resistant security device, as will be described in more detail later on.

For enhanced privacy, the application manages for example user pseudonyms.

The invention will now mainly be presented in the context of GSM SIMs, although the ideas are also applicable to UMTS SIMs, or in fact any tamper-resistant security device having AKA functionality, and a similar application and interface as described below. Other examples include the ISIMs used for 3GPP IP multimedia, or more generally UICC cards that may contain several SIMs at the same time.

The application is preferably implemented as a software application, which may be pre-installed during manufacture or provided as an authenticated application download into an application environment of the tamper-resistant security device.

Figure 5:
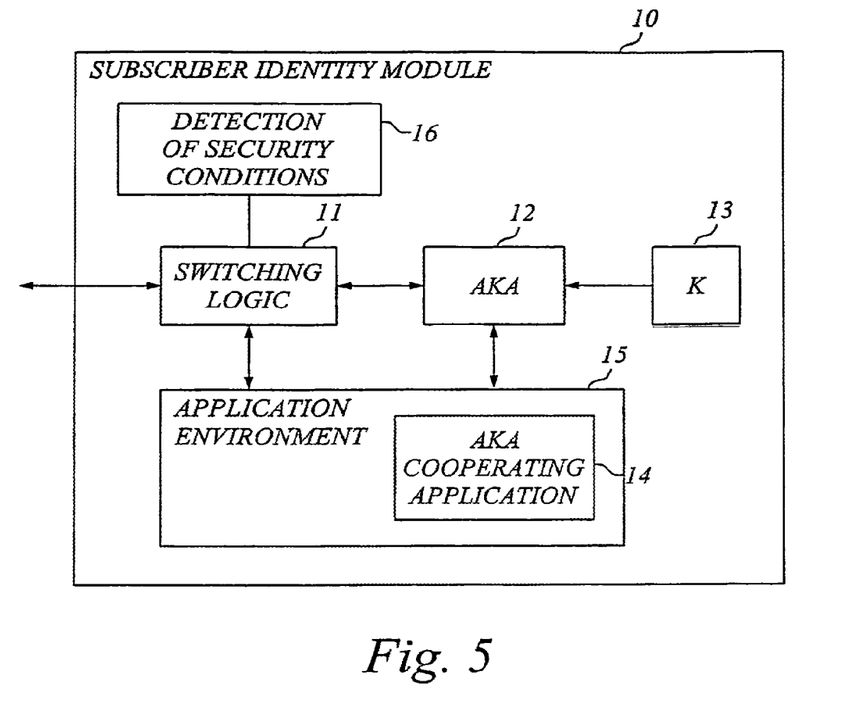
FIG. 5 is a block diagram of an exemplary embodiment of a tamper-resistant device according to the invention realized as a subscriber identity module.

The SIM 10 illustrated in FIG. 5 includes switching logic 11, an AKA module 12, a security key K 13, an application environment 15, and preferably also a module 16 for detecting security conditions in relation to the SIM, for example whether the SIM 10 is operated in its normal secure environment or in a less secure environment. The switching logic 11 parses the commands sent to the SIM, handles communication with internal modules and also forwards outbound data to the user terminal in which the SIM is located. The AKA module 12 performs an AKA process using the security key K, e.g. a subscription key associated with a client-operator subscription, or a key derived therefrom. In GSM SIMs, this function is generally the A3/A8 AKA algorithms.

The Application Environment

The application environment 15 is advantageously provided by the application toolkit of the subscriber identity module, and is generally an environment capable of executing code. For a GSM SIM the application environment may be provided by the SIM Application Toolkit (SAT) [5], whereas the analogue application environment of UMTS SIM (USIM) is provided by UMTS SAT (USAT) [6].

For a GSM SIM, the SIM-ME (SIM-Mobile Equipment) interface specifies the "commands" and data that can be sent to/from the SIM/ME. For instance, to run the GSM A3/A8 AKA algorithms, there is a RUN_GSM_ALGORITHMS command that routes input parameters/output results to/from the resident AKA algorithms. The AKA algorithms compute a response and/or one or more keys based on the challenge RAND (and the stored security key). In the list of commands possible over the SIM-ME interface, we specially note the ENVELOPE command. This command is intended to send more or less arbitrary data to the SIM for use with the SIM Application Toolkit (SAT). The input/output format to the SIM is explicitly specified, but there is a high degree of freedom as to exactly what the applications can do or not. For instance, the application could be a quite general Java Applet, see reference [7]. The applet can be given various degrees of authorization to access resident GSM-related files, one possibility being to give it "full GSM access".

In a preferred embodiment of the invention, the AKA cooperating application 14 is implemented in the application environment provided by the SIM application toolkit, using the ENVELOPE command, or an analogous command. Input/output data to the application is then preferably also transferred into the SAT by means of the ENVELOPE command.

For communication between the software application 14 in the SAT environment 15 and the AKA module 12, there is preferably a special interface, such as a dedicated API, between the AKA module 12 and the SAT application environment 15.

The SIM Application Toolkit (SAT) enables the operator to either "hardcode", or download over the air, the AKA cooperating application 14 into the SIM. In the latter download case, it is also possible (and strongly recommended) to authenticate the application as coming from a trusted party, such as the right operator. This is important since it gives protection against downloading "viruses" from malicious servers. The downloaded application can also be encrypted so that the application content is not available outside the SIM. For security aspects related to the GSM SAT, reference is made to [8]. By implementing the application in the application environment of the SIM, it is also possible to upgrade the functionality thereof. Upgrades are simply downloaded using the ENVELOPE command.

Figure 6:
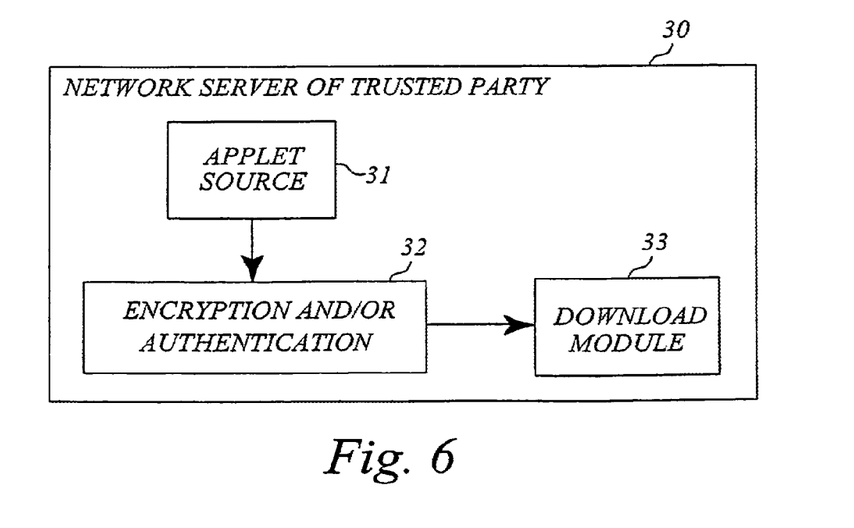
FIG. 6 is a schematic diagram of a network server supporting security and/or privacy enhancements in tamper-resistant security devices according to an exemplary embodiment of the invention.

FIG. 6 is a schematic diagram of a network server supporting download of security and/or privacy enhancement applications or applets into a tamper-resistant security device. The network server 30 is typically managed by a trusted party such as the network operator and basically comprises an applet source 31, a module 32 for encryption/authentication purposes and a download module 33.

Security Policy Processing

As previously mentioned, some form of security policy processing is typically implemented in the tamper-resistant security device and/or the user terminal, and the security policy processing is preferably based on information that represents the security conditions of the tamper-resistant security device. Examples of relevant security conditions may include the environment in which the security device is operated, the interface over which a request for AKA processing comes, the network used by the user terminal for network communication and so forth.

For increased security control, the SIM or more generally the security device preferably authorizes access to resident application files and commands that could expose the AKA process and the corresponding AKA parameters only under certain security conditions or circumstances. The security conditions can for example be detected internally in the tamper-resistant security device or externally, e.g. by the user terminal.

With reference once again to FIG. 5, it can be seen that the SIM includes a module 16 for detection of security conditions, such as the environment in which the SIM is placed. For example, the SIM or more generally the security device preferably authorizes access to resident application files and commands that could expose the AKA process and the corresponding AKA parameters only if the SIM is operated in its normal environment (e.g. a mobile phone). If the SIM is located in or otherwise exposed to a foreign less secure environment access to such resident files and commands is preferably disabled. Instead, any requests for AKA processing are conveniently routed to the security and/or privacy enhancing application. This is a perfect example of a security policy that is implemented and enforced in the tamper-resistant security device.

It should be understood that the enhanced security and/or privacy processing may not be required when the security device is operated in its normal environment, using the normal network interface of the user terminal. On the other hand, for insecure environments, it may be advantageous to customize the security processing depending on the particular insecure environment in which the SIM is placed. In practice, this can be accomplished by providing a number of different customized security-enhancing modules or sub applications, and selecting among these modules in dependence on the environment.

When for example a GSM SIM is used externally to its normal environment, it is recommendable that the normal RUN_GSM_ALGORITHMS command/interface can be deactivated (otherwise a virus could still use that command). A number of possibilities to accomplish such a deactivation will now be described.

If the SIM is only to be used outside the normal terminal (i.e. we have a special purpose SIM), then one may simply manufacture a SIM so that it does not accept the RUN_GSM_ALGORITHMS command, or, so that this command is always internally "re-routed" to the SAT environment and the software application(s) running therein. Of course, in this case it might appear that it is better to simply build a special purpose SIM from scratch. However, if most of the existing SIM architecture can be re-used, this is of course a benefit.

As illustrated in FIG. 5, the security-device or SIM is preferably provided with the capability of checking the identity/type of the terminal or handset in which it is used. This may be performed on power-up and accomplished by the module 16, which is configured for detecting whether the SIM 10 is operated in its normal secure environment (normally the mobile) or in a less secure environment such as a PC or the like. The detection module 16 preferably controls the switching logic 11 so that AKA request are transferred directly to the AKA module or re-routed to the application environment depending on the circumstances. This functionality could thus be utilized so that when the SIM discovers or suspects that it is not in the (correct) terminal/handset, it assumes that it is external (in an insecure environment) and enters a mode where it only accepts the SAT commands, and all requests for AKA access by resident files or commands are denied.

There is also a possibility to associate more than one PIN code with the SIM. In this case, a specific PIN code could inform the SIM that it is used in an external device, and set access rights accordingly so that only the "harmless" SAT commands are accepted. Here, the PIN code for normal SIM access may have to be reconfirmed to prevent activation of normal access by mistake.

Figure 7:
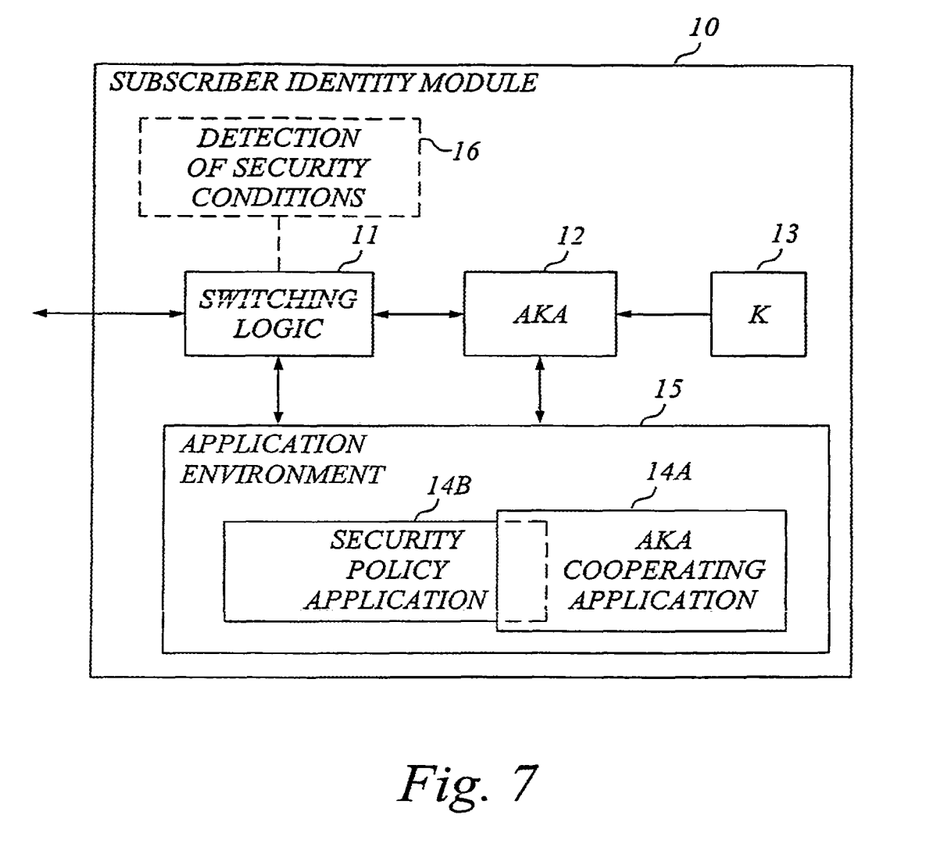
FIG. 7 is a block diagram of an alternative embodiment of a tamper-resistant device in which one or more security policies and corresponding security policy processing is implemented in the application environment of the security device.

It is also possible to implement one or more security policies and corresponding security policy processing in the application environment of the tamper-resistant security device, as schematically indicated in FIG. 7. In this example, the application environment 15 includes an AKA cooperating application 14A such as a security enhancing application, and a security policy application 14B. The security policy application 14B may be partly or fully integrated with the security enhancing application 14A, or provided as a separate application. In a practical scenario, the normal AKA command(s) may be disabled (e.g. by controlling the switching logic 11 or by other means) by default at power-up, and initially information on the security conditions of the SIM is transferred to the security policy application 14B, which then takes a security policy decision for appropriate further actions. For example, if the security policy application 14B is informed that the SIM is placed in its normal environment (e.g. the mobile), the security policy application 14B enables the normal AKA command(s). If the security policy application 14B is informed that the SIM is placed in another less secure environment, the normal AKA command(s) will continue to be disabled, and all requests for AKA processing are transferred to the security enhancing application 14A, which handles the AKA requests in accordance with the applicable security policy. The security conditions of the SIM may be detected internally or externally to the SIM, although a higher degree of autonomy and security may be obtained when the SIM itself is provided with functionality for detecting the relevant security conditions. The security policies and the corresponding security policy processing may be either "hardcoded" by a trusted party such as the home operator, or downloaded (encrypted/authenticated) into the application environment of the SIM. The SAT environment and the ENVELOPE command (or equivalent) make downloads of issued security policies as well as policy changes practically feasible. Even if the SIM is operated in the normal terminal (mobile), it may be desirable to re-use the AKA protocol over other interfaces than the normal (GSM/UMTS) network interface. In order to handle the security issues in this case, different solutions are feasible.

In a typical payment scenario for example, the user will simply start a payment application that follows some standardized protocol, in which an AKA request is re-routed, using e.g. the ENVELOPE or equivalent command, to a security enhancing application. In this case, the problem is solved on the application level.

In addition, in the above payment scenario, it may also be desirable for the user to stay anonymous with respect to third parties. Therefore, a privacy enhancing application generating a user pseudonym may be invoked after proper and secure authentication, as will be described in detail later on.

Furthermore, the terminal (mobile) may be configured to determine whether the AKA request initially comes over the normal network interface, or over another interface such as Bluetooth or IRDA (Infrared Data Association) interfaces. For example, this means that the mobile itself is capable of detecting when a request for SIM access comes over less secure interfaces, and taking appropriate actions accordingly. The origin of the request may for example be determined by the terminal based on port identification (IR Port, Bluetooth Port, Normal Radio Interface Port, etc.). Typically, instead of transferring a request for AKA processing directly to the AKA module, using the normal resident command, the AKA request is re-routed to the security enhancing application by the terminal using the SAT application environment command when the request comes over the Bluetooth or IRDA interface. This is another example of a security policy suitable for implementation by the invention. Here also, it may be advantageous to customize the security processing by providing a number of different sub applications and selecting among the sub applications depending on the particular type of interface used by the terminal.

Another example of a security policy suitable for implementation in a tamper-resistant security device of the invention is related to the existing proposals for enhancing the security of the 3GPP Gb interface [13]. When security is in place there is also a need for policies that govern how/when to use security. Sometimes low/no security can be accepted, sometimes it cannot. Specifically, during negotiation of which security algorithms to use, there may be a problem that a man-in-the-middle performs a so-called "bidding-down attack". Suppose that the mobile terminal signals to the network that it is capable of using security algorithm "A" and "B", where "A" is much stronger than "B". If an attacker now simply deletes "A" from the list of supported algorithms, the network will believe that the mobile only supports "B" and the mobile terminal/network will end up using suboptimal security, even if both parties support also "A". For this reason, there is a suggestion to add some form of integrity protection of the negotiation. However, for some time there will be a mix of networks supporting the enhanced security negotiation, as well as some networks that have not yet been upgraded. Therefore, operators may wish to issue a policy to their subscribers, dictating if the mobile terminal should accept an insecure negotiation in a foreign, visited network. Clearly, an attractive placement for this policy control is in the application environment of a tamper-resistant security device such as a SIM. The decision as to whether insecure negotiation should be accepted is preferably based on information that is integrity protected via AKA.

Yet another variant of security policy processing is to identify the network/operator, for example by examining incoming AKA parameters, and customize the subsequent security processing in dependence on the network/operator identity. This assumes that different operators can be distinguished based on for example incoming AKA parameters.

For illustrative purposes, an example of a security policy table for implementation in a tamper-resistant security device according to the invention is presented below. TABLE-US-00001 TABLE I Security conditions Security mode Network/ Normal Security-enhancing Environment Operator Interface AKA sub application Mobile Home Normal Enabled—PC Home Normal Disabled 01 Mobile Home Bluetooth Disabled 02 Mobile Home IR Disabled 03 Mobile Home WLAN Disabled 04 Mobile Visited Normal—05 (negotiation) Mobile Operator A Normal Disabled 06 Mobile Operator B Normal Disabled 07 PC Visited WLAN Disabled 01, 04, 05

Modifications to the User Terminal

It is highly desirable to keep the SIM/ME interface intact, not affecting the standards (at least, even if new commands might need to be added, the SIMs can still be backwards compatible with the standard). It is of course also important to consider the issue of whether the terminals/handsets remain unaffected by the invention. When the SIM is to be used externally to the terminal/handset, obviously there is no need to change the handset, since it will not even be involved. In the case when the handset is to be used as an "authentication token" as discussed above, there is normally a need for modification. However, the mere fact that it should be possible to run GSM AKA commands over IRDA or Bluetooth alone makes modifications necessary (connecting the SIM to Bluetooth/IRDA), and our invention regarding the SIM functionality does not make it more difficult to introduce these changes.

Alternative Location for Implementing the AKA Algorithms

Figure 8:
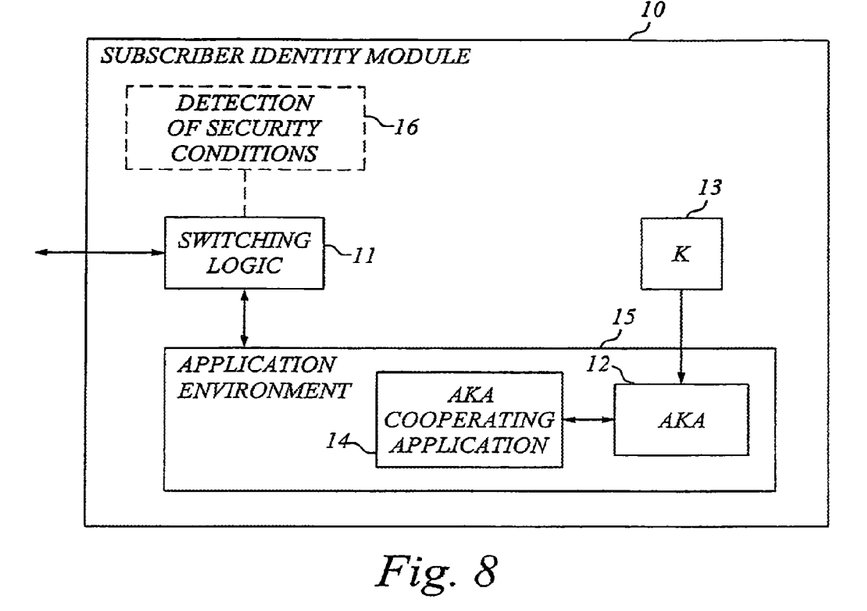
FIG. 8 is a block diagram of a further exemplary embodiment of a tamper-resistant device according to the invention realized as a subscriber identity module.
Figure 9:
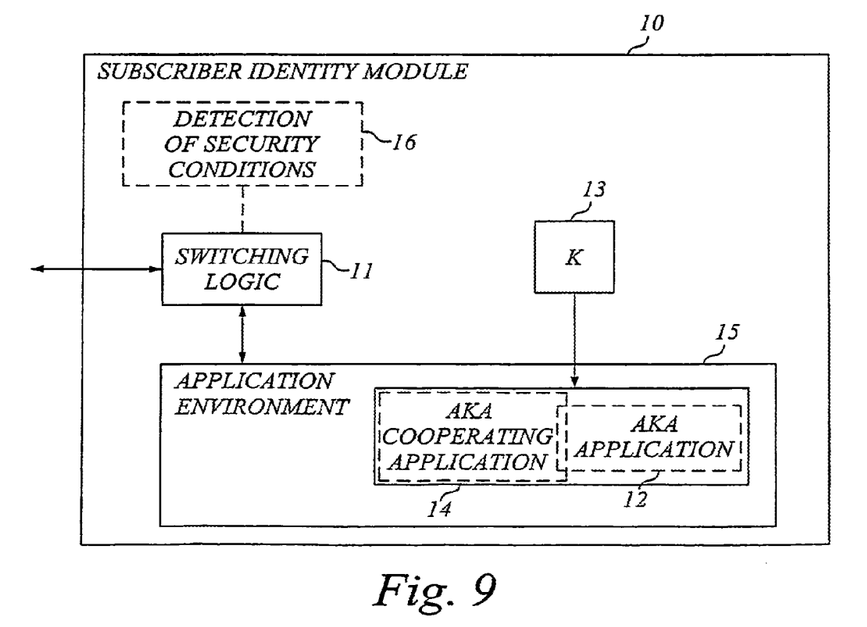
FIG. 9 is a block diagram of yet another exemplary embodiment of a tamper-resistant device according to the invention realized as a subscriber identity module.

It is also possible, though somewhat less preferred, to implement the AKA algorithms, or at least parts thereof, as an application in the application environment of the tamper-resistant device, with read-access to the security key (or possibly a key derived therefrom), as illustrated in FIGS. 8 and 9. In FIG. 8, the AKA cooperating application 14 and the AKA algorithms 12 are implemented as separate applications that are cooperating with each other. Alternatively, however, the two functions 12, 14 are integrated, at least partly, into the same software application, as schematically illustrated in FIG. 9.

In the following, the invention will mainly be described with reference to various non-limiting examples of enhanced security processing and privacy processing implemented as software in an SAT environment of a SIM.

For further information on fundamental details of the GSM SIM specification, reference is made to [9].

Example of Enhanced Security Processing

For example, to increase the security for a GSM SIM, for the purpose of normal GSM AKA, the following steps could be taken.

A SIM card is manufactured which follows [4, 5, and 9], but in addition has an internal API, or similar interface, from the SAT environment to the A3/A8 algorithms. Note that this has no impact on existing SIM standard specifications.

In addition, if the SIM is to be used externally to the phone, plugged into some other device, it is highly recommendable to make provisions so that the normal RUN_GSM_ALGO-RITHMS command can be disabled. To this end, several different solutions are possible as previously discussed.

The operator provides the SIM (either during manufacturing, or, at later time as an authenticated application download) with an application configured for performing enhanced security processing in the SAT environment. For example, the security enhancing application could be configured for encapsulating AKA responses in a more secure algorithm, e.g. as suggested in the EAP SIM protocol. The challenges (RANDs) are sent as input data to the SAT application by means of the ENVELOPE command, rather than using the RUN_GSM_ALGORITHMS command on the SIM-ME interface. Alternatively, the whole applet is downloaded in real-time for each authentication. This gives the benefit of making it possible to authenticate the network (since the applet is authenticated) and to make sure the terminal always has the latest "release" of the applet. Of course, this authentication will in general anyway be achieved without downloading the whole applet, for instance by running a protocol in which the "RAND" values are authenticated and possibly also checked for replay and the authentication/freshness is verified in the SAT applet itself each time.

Figure 10:
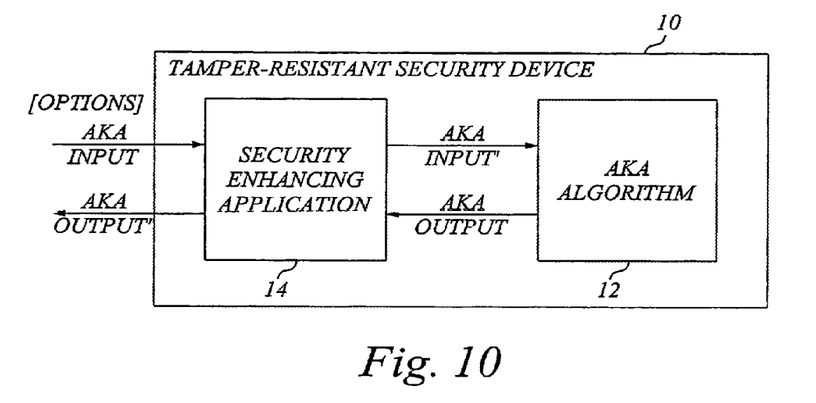
FIG. 10 is a schematic block diagram of a tamper-resistant security device illustrating the operation of a security enhancing application according to an exemplary embodiment of the present invention.

Regardless of the terminal type the SIM is attached to, and the way the SIM is accessed (by Bluetooth, IRDA, in cardreader, etc.) all AKA related processing takes place on the SIM, including the security enhancing steps. The enhanced security processing may involve manipulation of output parameters and/or input parameters of the AKA process, as schematically illustrated for a general tamper-resistant security device in FIG. 10.

For example, the EAP SIM protocol is based on encapsulation of sensitive parameters by manipulating AKA output parameters. Given a number of AKA responses RES(1), . . . , RES(n) resulting from a set of initial RAND values, RAND (1), . . . , RAND(n), the AKA responses may be encapsulated in the following way to produce a resulting higher-security response RES': h(key, RES(1), . . . , RES(n))

where h is a keyed function, e.g. based on SHA-1. In other words, the n responses are combined to a single response by a keyed function. Similarly, a longer key $K.sub.c'$ may be generated by concatenating the keys $K.sub.c(1), \ldots K.sub.c(n)$ resulting from the above set of RAND values, possibly followed by additional processing.

Figure 11:
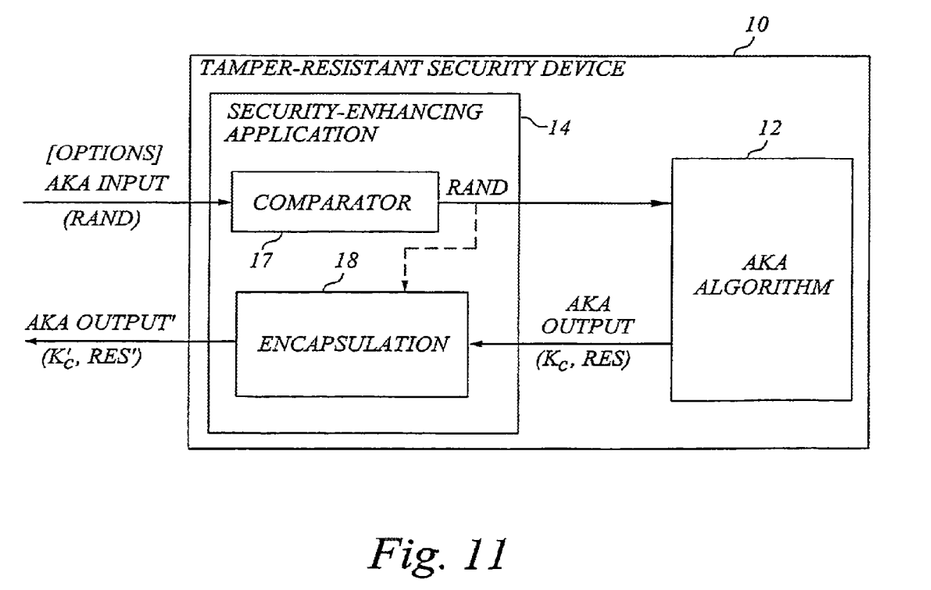
FIG. 11 is schematic block diagram of a tamper-resistant security device illustrating a security enhancing application with encapsulation and comparative pre-processing according to an exemplary embodiment of the present invention.

The approach of using several RAND values in sequence to derive longer keys was recently discovered to have some flaws [11]. For instance, by issuing the same RAND value repeated n times, rather than n distinct RAND values, the effective security obtained may still only be equivalent to that obtained from a single RAND value. In general, by comparing the relevant set of AKA input parameters for freshness and/or uniqueness, this particular problem can be solved. In accordance with a particular embodiment of the invention, the security enhancing application 14 implemented on the tamper-resistant security device 10 (e.g. a SIM) therefore includes a comparator 17 together with an encapsulation module 18, as illustrated schematically in FIG. 11. For example, the encapsulation module 18 performs encapsulation by combination of a predetermined number of consecutive AKA output parameters (K.sub.c, RES) generated in response to a number of corresponding AKA input parameters (RAND). The comparator 17 compares the relevant set of consecutive AKA input parameters (RAND) for verifying that all of these AKA input parameters are unique. Typically, the comparator 17 expects to receive a set comprising a given number of consecutive input parameters (RAND values) for the overall encapsulation, and compares each incoming input parameter against each of the previous input parameters in that set. In this way, it can be ensured that the resulting "masked" AKA output parameters (K.sub.c', RES') are generated in response to a set of unique AKA input parameters (RAND values). If desired, the AKA input parameters may also be fed into the encapsulation module 18 as additional input for the encapsulation, as indicated by the dashed line in FIG. 11. Alternatively, the freshness/uniqueness of the AKA input parameters may be determined in other ways, for example by using time-stamped AKA input parameters and checking that the time stamps of a given set of parameters are within a predetermined time interval.

Yet another feature from the EAP-SIM protocol that may be generalized and implemented into an AKA cooperating application is authentication of the network over which the user terminal communicates. In normal GSM AKA, the network sends an authentication request together with a RAND, and the SIM simply replies with a response RES. This authentication can be extended by letting the SIM or equivalent tamper-resistant security device send a new random value RAND' to the network side in response to the authentication request. The network then calculates a MAC (Message Authentication Code) or similar based on the received RAND' and a session key derived from RAND and the SIM key K, and sends the MAC back to the SIM for verification of the authenticity of the network. The relevant steps of such an extended protocol could be designed in the following way:

1. Network sends authentication request to SIM.
2. SIM sends RAND' to network.
3. Network generates RAND, calculates MAC (key, RAND, RAND', . . . ) and sends RAND and MAC to the SIM.
4. SIM checks MAC, and if OK calculates keys/responses.

The encapsulation of AKA keys/responses suggested in the EAP SIM protocol generally implies manipulation of AKA output parameters. It is however also possible to manipulate input parameters to the AKA process. For example, a new manipulated input can be calculated as: h (key, RAND), so that the output response is equal to: A8 (key, h (key, RAND)), where h is a keyed function, e.g. based on SHA-1. An example of manipulation of both input parameters and output parameters is to generate the final resulting output response as: g (key, A8 (key, h (key, RAND))), where g and h are keyed functions, for example based on SHA-1.

No sensitive data is available outside the SIM, and the security functionality can also be extended to provide more than one key and so forth.

Corresponding manipulation/encapsulation could be performed for UMTS, using USIMs. Also for ISIMs used for 3GPP IP multimedia, there is a proposal to "encapsulate" authentication messages in the HTTP digest protocol, [12]. This encapsulation can be achieved by the current invention.

Examples of pre-processing of AKA input parameters include:

Verification of the freshness of AKA input parameter(s);
Verification of the integrity of AKA input parameter(s);
Decryption of AKA input parameter(s);
Combination of AKA input parameter(s); and
Security policy decision based on AKA input parameter(s).

Examples of post-processing of AKA output parameters include:

Combination of a number of generated AKA output parameters (K.sub.c and/or RES) into one or more (possibly longer) modified AKA output parameters (K.sub.c' and/or RES');
Integrity protection of generated AKA output parameter(s);
Encryption of generated AKA output parameter(s); and
Policy decision and/or enforcement of AKA output parameter(s) based on examination of AKA input parameter(s).

Enhanced Security Processing for Lawful Interception

There are legal requirements on lawful interception. That is, network operators must by court order be able to supply plaintext conversation to law enforcement agencies. In the classical GSM case this is easy since only the link between the ME and the RBS (Radio Base Station) is encrypted (with a key that the operator knows).

It is expected that we will soon see end-to-end (e2e) encryption between users. That is, before the conversation starts, an e2e key-agreement between the two users is performed, e.g. using the protocol MIKEY as specified in [10].

This makes lawful interception harder, since the operator must somehow be able to deduce the same key as the users obtain shared between them. The invention proposes that at least parts of the operations and computations required in connection with the e2e key-agreement are implemented as an application in a SAT-like environment, by upgrading the SIM with an application that, based on the operator-user shared key k, derives also end-to-end keys between users A and B, that "automatically" become known to the operator too.

For example, let $g.sup.x$ denote exponentiation in some suitable (secure) group G, e.g. the integers modulo a prime p, or the points on an elliptic curve over a finite field. The outcome of the GSM (or UMTS) AKA for user A is a key, kA. Similarly, user B gets a key kB. We now perform a Diffie-Hellman protocol, [14], where A sends $g.sup.kA$ to B, and B sends $g.sup.kB$ to A. The shared key is $g.sup.kA*kB$. Either operator (A's or B's home operator) can by knowing kA (or kB) and observing $g.sup.kB$ (or $g.sup.kA$) compute the very same key.

Note that if the terminal is to be extended with this extra functionality it is again desirable to implement the $g.sup.kA$ (and $g.sup.kB$) computation in the SIM itself, since otherwise kA (and kB) need to leave the protected environment of the SIM. With the present invention, the whole computation can indeed be done in the SIM, preferably in a SAT application, which can be easily upgraded with new key-exchange methods.

For information on e2e encryption and lawful interception, reference is made to our earlier patent application [15], which is incorporated herein by reference.

Still, a problem, discussed in [15], is that not only the home operators will be able to "eavesdrop" on the communication between A and B, but also the operator of the visited networks in which A and B are at the moment. This might be a threat if the operator of the visited network is not 100% trustworthy. This is an effect of kA (and kB) being sent to the visited networks. To solve this, the method proposed in [15] or a similar method can be used. Let k be the key shared between the user and the home net (stored on the SIM). Instead of sending kA=kdf(k, RAND) to the visited net, where kdf is a key derivation function, we send kA'=f(kA) (and similarly for kB) to the visited net, where f is some one-way function. The one-way property assures that someone only knowing kA', can still not know what kA is. The key kA' is now (transparently) used for the normal GSM/UMTS security, whereas it is still kA (and kB) that is used as a basis for the e2e key agreement between A and B, using for example the Diffie-Hellman protocol. Now, only the home operators can perform lawful interception. The idea according to the invention is to implement the masking functionality of the function f in a SAT-like application.

Enhanced Security Processing for Public Access

A problem that is related to the last issue above is the following. There are plans to provide public "hot-spots" where mobile users temporarily gain higher bit-rates by another access technology, e.g. IEEE 802.11 WLAN (Wireless LAN). A problem here is that the "base station" or AP (Access Point) is in an untrusted environment. This could mean that it is possible to physically "tap" into the AP for sensitive data, such as keys for integrity protection of traffic, necessary for the operator to bill the traffic correctly. Therefore, some ideas exist where the integrity protection is terminated in some other node, called the ASN (Access Service Node), further into the network, thus being more protected.

Still, there might be conventional 802.11 or similar integrity protection in place between the terminal and the AP and thus two keys are needed:

a key, k1, to protect the ME-AP link; and a key, k2, to protect the ME-ASN link, which must not be available in the AP.

This means that, based on the subscriber key, stored on the SIM, two keys must be derived, rather than just one. Moreover, k2 must not be deducible from k1. This can be accomplished by deriving k2 using the normal AKA protocol, and then k1=f(k2) for a suitable one-way function, where only this latter k1 is sent to the AP. Again, at least the generation of the further key k1 can be implemented securely as a SAT application on the SIM itself using the current invention.

Privacy Enhancements

In another aspect of the invention, the SIM or similar security device (and more particularly the application toolkit thereof) is used to enhance the privacy of the user in a convenient way, for example by managing user pseudonyms.

Typically, a user is assigned a temporary identifier or pseudonym during attachment to the network in order to protect his true identity. In addition, the pseudonym can be refreshed multiple times to make even linking of transactions impossible. Preferably, the temporary id, tmpID, is just a string selected at random each time the user connects. It could be chosen by the user (e.g. by the user's communication device) or assigned to him by the network. The latter having the advantage that it is easy to assure uniqueness for each used pseudonym.

It should though be understood that the assignment of user pseudonyms may involve both the network and the user terminal. For example, the temporary id may be defined by a first part from the network and a second part, which for example may be specific to the home operator of the user, from the user terminal. An example of such a tmpID may be "4711@xyz.com", where the first part "4711" is assigned by the network, and the second part "@xyz.com" is assigned in the user terminal.

Consider a multi-access scenario, where the user now and then changes access. The user is typically assigned a new identity when the access changes. However, the new assignment must normally be based on the old tmpID, i.e. the ID used for the previous network/device, or, the ID used in a previous session with the same network. This means that the tmpID somehow needs initially to be carried over to the new access method or service provider. This causes synchronization problems. For instance the user could change from GPRS terminal access to a Wireless LAN access on a laptop computer.

With the present invention, it is possible for the SIM, or similar security device, to store and administrate the tmpIDs, preferably in a SAT application or equivalent. When the user changes access, the SIM is connected to the new terminal (e.g. by physically moving it), thereby transferring the current tmpID (and possibly other existing security parameters) over to the new device. The new network can, preferably after having authenticated the user (involving the AKA module), now assign him a new temporary ID, tmpID'. In the somewhat simpler case that the same terminal is used but for a new session, the SIM will similarly "remember" the ID used previously and does not need to be physically moved.

Figure 12:
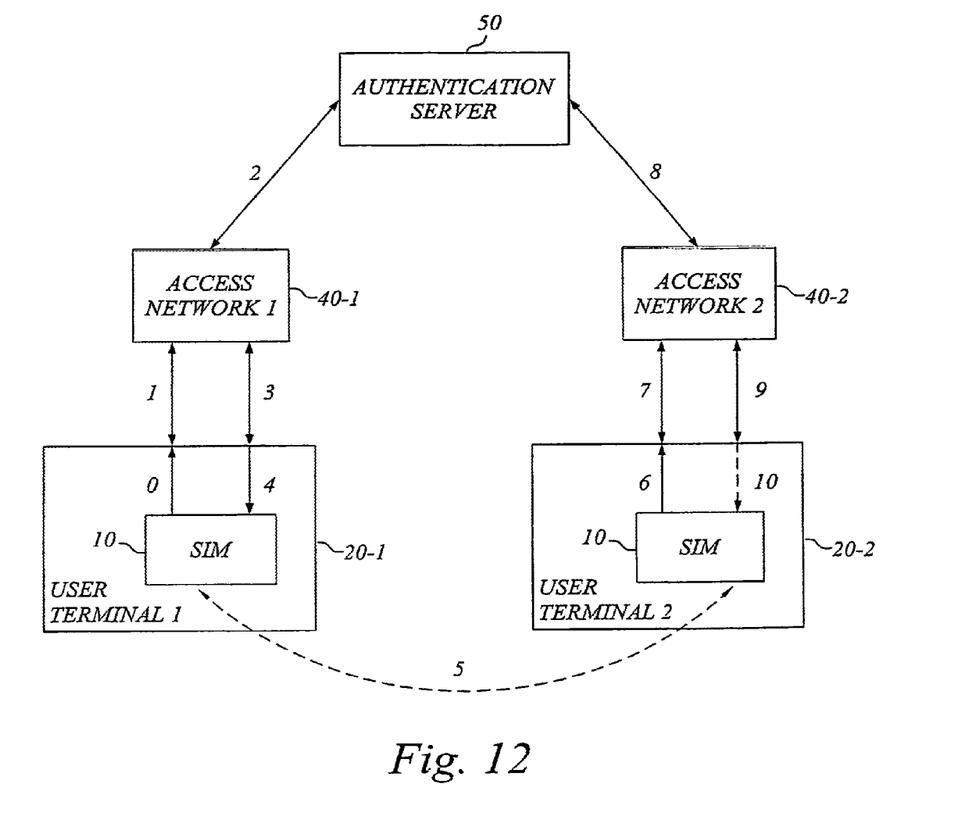
FIG. 12 is a diagram illustrating an authentication process with privacy enhancement obtained by a tamper-resistant subscriber identity module according to the invention.

As illustrated in FIG. 12, credentials (including e.g. authentication responses and an already existing ID) are retrieved (0) from the SIM 10, which is arranged in a first user terminal 20-1, and a user/network authentication protocol between the SIM 10 and a first access network 40-1 is carried out (1). This authentication possibly involves (2) an external authentication server 50. The user obtains a new pseudonym (3), tmpID, which is stored (4) in the SIM 10-1. Steps (1-4/3-4) may optionally be repeated at intervals, resulting in re-authentication and/or new pseudonyms. After some time, the user of the first user terminal 20-1 finds it desirable to change access to a second user terminal 20-2 and a second access network 40-2. The SIM 10 is moved (5) to the second user terminal 20-2. Possibly, using existing credentials/tmpID (6), the user needs to re-authenticate (7) to the new network 40-2, again possibly involving (8) the authentication server 50. Optionally, the user's pseudonym is refreshed (9) to a new value tmpID', and that new value is then stored in the SIM 10. Again, steps (7-9/8-9) may be repeated at intervals to enhance privacy and security.

It may of course also be the case that the two terminals 20-1 and 20-2 are identical, and the two accesses are obtained by different access means in the same terminal 20, in which case the SIM 10 never leaves the terminal, but still manages IDs across access changes.

The execution of the privacy enhancing application is typically conditional, depending on whether or not the AKA authentication is successful. For example, the privacy enhancement application is only executed in response to successful authentication.

Considering the case when the temporary identifier is assigned, at least partly, by the user terminal, it may be possible to generate the new tmpID' or at least parts thereof by using the AKA module, for example by calculating the new tmpID' as: new tmpID'=s (key, A8 (key, old tmpID)), where s is a keyed function, e.g. based on SHA-1. In this particular example, the privacy enhancing application in the SAT environment of the SIM will send the old tmpID to the AKA module and receive an A8 response, which is used by the privacy enhancing application to calculate the new tmpID'.

Alternatively, the network assigns a new pseudonym tmpID' for the user. The assigned pseudonym is then securely transferred (encrypted/authenticated) to the SIM or equivalent tamper-resistant security device, in which the pseudonym is decrypted and/or authenticated by means of the SIM key and recorded and administrated in the privacy enhancing application. In yet another embodiment, the privacy enhancing application simply randomizes a new tmpID', which is accepted by the network if the AKA response is correct.

Hardware Implementations

It should be understood that although a software implementation is particularly beneficial, it is also possible to have the AKA cooperating application premanufactured as hardware in the tamper-resistant security device, with a more or less direct interface between the hardware application and the AKA module.

Figure 13:
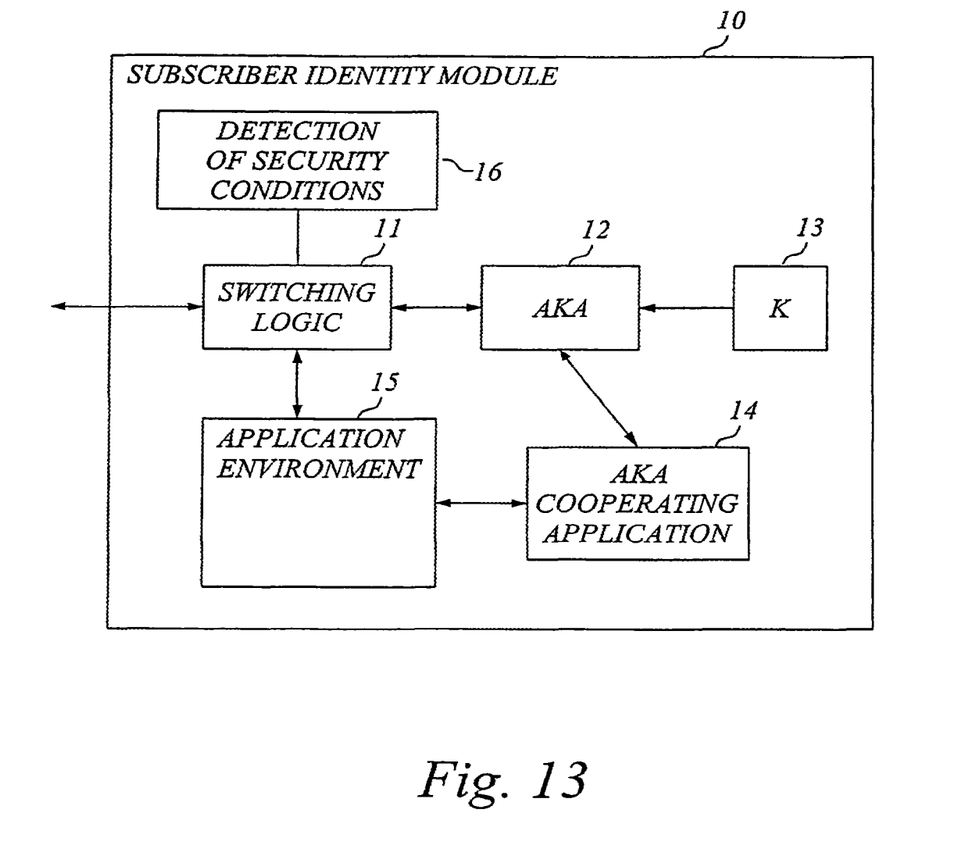
FIG. 13 is a block diagram of another exemplary embodiment of a tamper-resistant device according to the invention realized as a subscriber identity module.

FIG. 13 illustrates an example of a particularly beneficial hardware implementation, which utilizes the application environment of the SIM and the existing commands (e.g. the ENVELOPE command) for transferring input data to the application environment, and then routes the input data from the application environment via an additional interface to the premanufactured hardware application module on the SIM. The hardware application interfaces the AKA module more or less directly, preferably through a special interface, and finally forwards the output data to the user terminal via the application environment.

In yet another implementation, the AKA module and the cooperating application, such as a security enhancing application, are integrated in the same hardware circuit on the SIM. However, in such an integrated hardware implementation, it should preferably still be possible to select between normal AKA processing and enhanced AKA processing depending on the operational environment of the SIM.

A hardware implementation does not exclude the possibility of later downloading a software application, which may replace the hardware application, or a software patch that may cooperate with the hardware application.

Finally, we refer to our earlier patent application [16], which is incorporated herein by reference.

The embodiments described above are merely given as examples, and it should be understood that the present invention is not limited thereto. Further modifications, changes and improvements which retain the basic underlying principles disclosed and claimed herein are within the scope of the invention.

REFERENCES

[1] Haverinen, "EAP SIM Authentication", draft-haverinen-pppext-eap-sim-05.txt, IETF.
[2] Federal Information Processing Standard FIPS PUB 180-1, NIST.
[3] Arkko and Haverinen: "EAP AKA Authentication", draft-arkko-pppext-eap-aka-04.txt, IETF.
[4] 3GPP TS 11.11 Technical Specification 3rd Generation Partnership Project; Technical Specification Group Terminals Specification of the Subscriber Identity Module—Mobile Equipment (SIM—ME) interface.
[5] 3GPP TS 11.14 Technical Specification 3rd Generation Partnership Project; Specification of the SIM Application Toolkit for the Subscriber Identity Module—Mobile Equipment (SIM—ME) interface.
[6] 3GPP TS 31.111 Technical Specification 3rd Generation Partnership Project; Technical Specification Group Terminals; USIM Application Toolkit (USAT).
[7] 3GPP TS 03.19 Technical Specification 3rd Generation Partnership Project; Technical Specification Group Terminals; Subscriber Identity Module Application Programming Interface (SIM API) for Java Card™; Stage 2.
[8] 3GPP TS 03.48 Technical Specification 3rd Generation Partnership Project; Technical Specification Group Terminals; Security Mechanisms for the SIM application toolkit; Stage 2.
[9] ETSI TS 100 922 Technical Specification Digital cellular telecommunications system (Phase 2+); Subscriber Identity Modules (SIM); Functional characteristics.
[10] Arkko, Carrara, Lindholm, Naslund, and Norman, "MIKEY: Multimedia Internet KEYing", draft-ietf-msec-mikey-04.txt, IETF.
[11] Sarvar Patel, "Analysis of EAP-SIM Session Key Agreement", posted on the Internet on May 29, 2003.
[12] Niemi, Arkko, Torvinen, IETF RFC 3310, "HTTP Digest Authentication Using AKA", September 2002.
[13] 3GPP TSG WG3 Security, "Enhanced Security for A/Gb", Jul. 15-18, 2003.
[14], Menezes, van Oorschot, and Vanstone: "Handbook of Applied Cryptography", CRC Press, pp. 489-541.
[15] UK Patent Application No. 0129339-8, filed Dec. 7, 2001.
[16] International Patent Application WO 02/084980, claiming priority from Swedish Patent Application No. 0101295-4 filed Apr. 10, 2001.

The invention claimed is:

1. A Subscriber Identity Module (SIM) device for use in a mobile terminal, comprising:
 a non-transitory storage memory configured to store user credentials including at least a security key;

a hardware or computer-implemented Authentication and Key Agreement (AKA) module configured to perform AKA processing with the security key;

an external hardware communications interface configured to receive AKA processing commands from the mobile terminal and to return processing results performed in the SIM device in response to the AKA processing commands;

a hardware or computer-implemented security and/or privacy enhancing application configured to cooperate with the AKA module and to perform (i) enhanced security pre-processing of an AKA input parameter associated with an AKA processing command received via the external hardware communications interface and/or (ii) enhanced security post-processing of an AKA output parameter associated with the AKA processing received from the AKA module to generate a further AKA input and/or output parameter which has an enhanced security as compared to the received AKA input and/or output parameter; and an application interface internal to the SIM device between the AKA module and the security and/or privacy enhancing application, wherein the SIM device is configured to:

perform all the AKA processing and steps related to security enhancing in the SIM device, register or detect information representative of security conditions in relation to the SIM device, wherein security conditions include at least one of: an environment in which the SIM device is operated, an interface over which a request for AKA processing comes, and a network used by the mobile terminal for network communications, and perform security policy processing based on the information.

2. The SIM device according to claim 1, wherein the enhanced security processing includes evaluation of a predetermined number of consecutive AKA input parameters for verifying that the predetermined number of consecutive AKA input parameters can be used securely.

3. The SIM device according to claim 2, wherein the enhanced security processing further includes combination of a predetermined number of consecutive AKA output parameters generated in response to a number of corresponding unique AKA input parameters.

4. The SIM device according to claim 1, wherein the security policy processing includes at least one of a security policy decision process and a security policy enforcement process.

5. The SIM device according to claim 1, wherein the SIM is further configured to selectively disable direct access to the AKA module.

6. The SIM device according to claim 1, wherein the SIM device is further configured to detect whether the SIM device is operated in its normal environment or in an environment considered insecure, and to disable direct access to the AKA module when operated in the insecure environment.

7. The SIM device according to claim 1, wherein the SIM device is further configured to transfer a request for AKA processing directly to the AKA module if the SIM device is operated in an environment considered secure, and to transfer the request to the security and/or privacy enhancing application if the SIM device is operated in an environment considered insecure.

8. The SIM device according to claim 1, wherein the SIM device is configured to perform computations in connection with end-to-end key agreement between users.

9. The SIM device according to claim 1, wherein the security and/or privacy enhancing application is configured to use masking key information generated by the AKA module.

10. The SIM device according to claim 1, wherein the security and/or privacy enhancing application is a software application installed in an application environment of the tamper-resistant security device.

11. The SIM device according to claim 1, wherein the security and/or privacy enhancing application is configured to request an AKA response from the AKA module based on an old user pseudonym and generate a currently amended user pseudonym based on a received AKA response.

12. The SIM device according to claim 1, wherein the one or more AKA process commands include a random challenge and the at least one AKA output parameter includes a response to the random challenge that matches the random challenge.

13. The SIM device according to claim 12, wherein the response is encapsulated using a function applied to manipulate the response to produce an enhanced security response.

14. The SIM device according to claim 13, wherein the function is a keyed function.

15. The SIM device according to claim 14, wherein the one or more AKA process commands include multiple random challenges and the at least one AKA output parameter includes multiple responses to the random challenges and the function is a keyed function of the multiple responses.

16. The SIM device according to claim 1, wherein the SIM device is configured to only permit access to the SIM device via the external interface such that the mobile terminal cannot send or receive a signal directly over the application interface internal to the SIM.

17. The SIM device according to claim 1, wherein the SIM device includes a card insertable into the mobile terminal.

18. The SIM device according to claim 1, wherein the SIM device includes one or more of a GSM SIM, a 3 G SIM, a UMTS SIM (USIM), or an IP Multimedia SIM (ISIM).

19. The SIM device according to claim 1, wherein the SIM device includes a UICC that contains multiple SIM applications.

20. A mobile terminal, comprising:
one or more network communication units, and
a SIM device according to claim 1 coupled to the one or more network communication units.

* * * * *